US011741349B2

(12) United States Patent
Holm et al.

(10) Patent No.: US 11,741,349 B2
(45) Date of Patent: Aug. 29, 2023

(54) PERFORMING MATRIX-VECTOR MULTIPLY OPERATIONS FOR NEURAL NETWORKS ON ELECTRONIC DEVICES

(71) Applicant: Arm Limited, Cambridge (GB)

(72) Inventors: Rune Holm, Cambridge (GB); John Wakefield Brothers, III, Calistoga, CA (US)

(73) Assignee: Arm Limited, Cambridge (GB)

(*) Notice: Subject to any disclaimer, the term of this patent is extended or adjusted under 35 U.S.C. 154(b) by 686 days.

(21) Appl. No.: 16/670,140

(22) Filed: Oct. 31, 2019

(65) Prior Publication Data

US 2021/0133542 A1  May 6, 2021

(51) Int. Cl.
*G06F 7/544* (2006.01)
*G06F 17/16* (2006.01)
*G06N 3/063* (2023.01)
*G06N 3/044* (2023.01)

(52) U.S. Cl.
CPC ........... *G06N 3/063* (2013.01); *G06F 7/5443* (2013.01); *G06F 17/16* (2013.01); *G06N 3/044* (2023.01)

(58) Field of Classification Search
CPC combination set(s) only.
See application file for complete search history.

(56) References Cited

U.S. PATENT DOCUMENTS

| | | | |
|---|---|---|---|
| 10,936,311 B1* | 3/2021 | Liu | G06F 9/3001 |
| 2017/0316312 A1* | 11/2017 | Goyal | G06N 3/0454 |
| 2019/0188239 A1* | 6/2019 | Serrano | G06F 9/38 |
| 2019/0205746 A1* | 7/2019 | Nurvitadhi | G06K 9/6256 |
| 2019/0220735 A1* | 7/2019 | Sengupta | G06F 3/0659 |
| 2020/0150926 A1* | 5/2020 | Connor | G06F 9/30018 |

OTHER PUBLICATIONS

Azad, A. et al., "A Work-Efficient Parallel Sparse Matrix-Sparse Vector Multiplication Algorithm," 2017 IEEE IPDPS, 2017, pp. 688-697 [online], [retrieved on Jun. 8, 2022], Retrieved from the Internet <URL: https://ieeexplore.ieee.org/stamp/stamp.jsp?tp=&arnumber=7967159> <DOI: 10.1109/IPDPS.2017.76>.*

(Continued)

*Primary Examiner* — Shawn Doman
(74) *Attorney, Agent, or Firm* — Vierra Magen Marcus LLP

(57) ABSTRACT

When performing a matrix-vector multiply operation for neural network processing, a set of one or more input vectors to be multiplied by a matrix of data values is scanned to identify data positions of the input vector(s) for which the data value is non-zero in at least one of the input vectors. For each of the data positions identified as having a non-zero value in at least one of the input vectors, the set of data values from the matrix of data values for that data position is fetched from memory and the matrix-vector multiply operation is performed using the data values for the input vectors for the data positions identified as being non-zero and the fetched set(s) of data values from the matrix of data values for those data position(s).

15 Claims, 12 Drawing Sheets

(56) References Cited

OTHER PUBLICATIONS

Yavits, L. et al., "Accelerator for Sparse Machine Learning," in IEEE Computer Architecture Letters, vol. 17, No. 1, pp. 21-24, Jan. 1-Jun. 2018 [online], [retrieved on Jun. 8, 2022]. Retrieved from the Internet <URL: https://ieeexplore.ieee.org/stamp/stamp.jsp?tp=&arnumber=7946089> <DOI: 10.1109/LCA.2017.2714667>.*

Yang, C. et al., "Fast Sparse Matrix and Sparse Vector Multiplication Algorithm on the GPU," 2015 IEEE IPDPS Workshop, 2015, pp. 841-847 [online], [retrieved on Jun. 8, 2022]. Retrieved from the Internet <URL: https://ieeexplore.ieee.org/stamp/stamp.jsp?tp=&arnumber=7284398> <DOI:10.1109/IPDPSW.2015.77>.*

* cited by examiner

PERFORMING MATRIX-VECTOR MULTIPLY OPERATIONS FOR NEURAL NETWORKS ON ELECTRONIC DEVICES

BACKGROUND

The technology described herein relates to the execution of neural networks on electronic devices, and in particular to the performance of matrix-vector multiply operations when executing a neural network, for example for fully connected neural network layers.

Neural networks can be used for processes such as machine learning, computer vision, and natural language processing operations. It is becoming increasingly common for neural networks to be employed in portable electronic devices, such as mobile phones, tablets and other devices for these purposes.

Neural networks generally comprise a number of layers which each process an input data array to provide an output data array (which becomes the input data array for the next layer). The layers, acting one after the other, may be able to process complex data (e.g. image or sound data) to provide a desired output (e.g. the identification of an object within an image, or a spoken word within a sound clip, or some other usable output inferred from the input data). This process is usually known as "inferencing" or "classification".

The different layers of a neural network may perform different operations on the input data arrays that they receive.

One common neural network layer operation, which is performed by, for example, fully connected neural network layers, is a matrix-vector multiply operation, in which an input vector to be processed by the neural network layer is multiplied by a weight matrix, for example to perform a multiply accumulate operation to provide a weighted sum of the data points represented by the input vector to generate a data point of an output data array (which will be the output of the neural network layer in question). In such arrangements, the input vector may, e.g., comprise of the order of 4096 data positions (data elements), with the weight matrix correspondingly comprising 4096×4096 data elements.

The weight matrices used for matrix vector multiply operations in fully connected neutral network layers typically comprise relatively large amounts of data, and are frequently too large to be retained in their entirety in local, on-chip storage, such that the weight matrix will need to be fetched from main memory when it is to be used. This can result in relatively large memory transactions being required for matrix vector multiply operations in fully connected neural network layers.

Thus, executing matrix vector multiply operations for a neural network may typically involve a large amount of data being transferred to and from memory. This increases the power consumption, processing burden, memory requirements and memory bandwidth usage within the device that is implementing the neural network. This can particularly be an issue in the case of lower power portable electronic devices, where processing and storage resources may be more constrained.

The Applicants accordingly believe that there remains scope for improvements to the processing of neural networks on electronic devices, and in particular in relation to the performance of matrix-vector multiply operations for neural networks on electronic devices.

BRIEF DESCRIPTION OF THE DRAWINGS

A number of embodiments of the technology described herein will now be described by way of example only and with reference to the accompanying drawings, in which:

FIG. 1 shows schematically a data processing system that the technology described herein may be used in;

FIG. 2 shows schematically an overview of a convolutional neural network (CNN) that the technology described herein may be used for;

DETAILED DESCRIPTION

Figure 1:
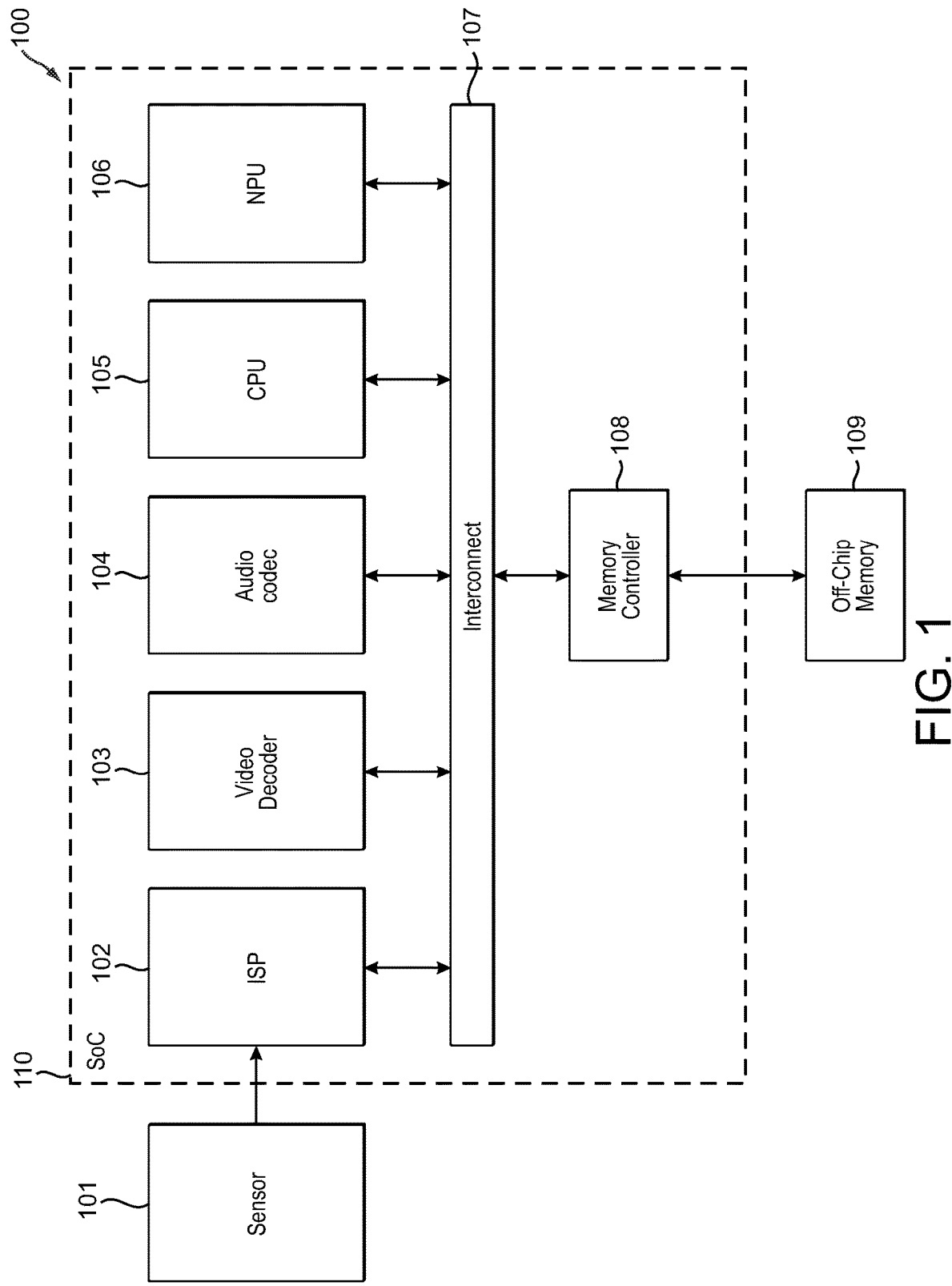

A first embodiment of the technology described herein comprises a method of performing a matrix-vector multiply operation when performing neural network processing in a data processing system, the data processing system comprising a processor operable to execute a neural network, and a memory for storing data relating to the neural network processing being performed by the processor; the method comprising:

when performing a matrix-vector multiply operation for neural network processing being performed by the processor:

for a set of one or more input vectors to be multiplied by a matrix of data values, each input vector comprising n data positions, and the matrix of data values comprising n respective sets of data values, one set for each data position of the input vector(s):

identifying a set of one or more of the n data positions of the input vector(s) for which the data value is non-zero in at least one of the input vectors in the set of one or more input vectors; and for each of the data positions identified as having a non-zero value in at least one of the input vectors in the set of one or more input vectors:

fetching from memory the set of data values from the matrix of data values for that data position; and for each input vector in the set of one or more input vectors:

performing a matrix-vector multiply operation using the data values for the input vector for the data positions in the set of one or more input vectors identified as being non-zero in at least one of the input vectors in the set of one or more input vectors and the fetched set(s) of data values from the matrix of data values for those data position(s).

A second embodiment of the technology described herein comprises a data processing system operable to perform neural network processing, the data processing system comprising:

a processor operable to execute a neural network; and
a memory for storing data relating to the neural network processing being performed by the processor;
the processor comprising:
a matrix-vector multiply circuit configured to perform matrix-vector multiply operations for neural network processing being performed by the processor;
an input vector scan circuit configured to, for a set of one or more input vectors to be multiplied by a matrix of data values, each input vector comprising n data positions, and the matrix of data values comprising n respective sets of data values, one set for each data position of the input vector(s):
identify a set of one or more of the n data positions of the input vector(s) for which the data value is non-zero in at least one of the input vectors in the set of one or more input vectors; and
a matrix data value fetching circuit configured to fetch from memory the set of data values from the matrix of data values for each of the data positions identified as having a non-zero value in at least one of the input vectors in the set of one or more input vectors;
wherein the matrix-vector multiply circuit is configured to perform, for each input vector in the set of one or more input vectors:
a matrix-vector multiply operation using the data values for the input vector for the data positions in the set of one or more input vectors identified as being non-zero in at least one of the input vectors in the set of one or more input vectors and the fetched set(s) of data values from the matrix of data values for those data position(s).

The technology described herein relates to the performance of matrix-vector multiply operations in neural networks. In the technology described herein, when a matrix-vector multiply operation is to be performed for a neural network, data positions for a set of one or more input vectors being processed that have non-zero values are first identified, and then the corresponding matrix data values that those data positions are to be multiplied by are fetched, and the matrix-vector multiply operation performed for the identified input vector data positions having non-zero values using the fetched matrix values for those input vector data positions.

The effect of this then is that, as will be discussed further below, the matrix values are fetched only for input vector data positions determined to have non-zero values, thereby reducing the number of matrix values that need to be fetched from memory, and accordingly the memory bandwidth, memory transactions, power, etc., that is consumed by the fetching of the matrix elements for the matrix-vector multiply operations.

In other words, in the technology described herein, when performing a matrix-vector multiply operation for a set of one or more input vectors, the matrix data elements are only fetched for those input vector positions that have non-zero data values. Correspondingly, the matrix data elements are not fetched for those input vector positions that have a value of zero for all the input vectors in the set of one or more input vectors that are to be subjected to the matrix-vector multiply operation.

The Applicants have recognised that, firstly, when performing a matrix-vector multiply operation, any input vector data positions having a value of zero will (usually) have no effect on the output result of the matrix-vector multiply operation, and so those operations can be omitted. Furthermore, the Applicants have recognised that in the case of matrix-vector multiply operations for, e.g., fully connected neural network layer processing, it can be relatively common for many of the input vector data positions to have a value of zero. For example, when the ReLU activation function is used, a significant number (30-80%) of the input vector data positions may have a value of zero.

The Applicants have further recognised that it can be relatively straightforward to identify those input vector positions having a value of zero/having non-zero values, when performing matrix-vector multiply operations for neural network processing, such that the identification of data positions for which the fetching of the matrix values for the matrix-vector multiply operation can be omitted can be relatively straightforward and cost-effective to perform in use.

The technology described herein accordingly operates to identify those input vector positions for which the matrix vector multiply operation needs to be performed (i.e. those input vector positions having non-zero values) (and conversely, those input vector positions for which the matrix vector multiply operation does not need to be performed (i.e. for which all the input vector values are zero), and then only loads the matrix values and performs the matrix-vector multiply operation for those input vector positions that that operation needs to be performed for (i.e. having a non-zero value for at least one of the input vectors in the set of input vectors that the operation is being performed together for).

The effect of this then is that the number of memory transactions for fetching the matrix values can be reduced, thereby saving on memory bandwidth, etc. Correspondingly, the number of matrix-vector multiply operations can also be reduced, thereby reducing the processing burden and saving power, etc., when performing matrix-vector multiply operations for neural network processing.

The data processing system of the technology described herein may be any suitable data processing system that can execute a neural network and may comprise any suitable and desired components and elements that a data processing system can comprise, such as one or more or all of: a display processing unit, a central processing unit (CPU), a graphics processing unit (GPU) (graphics processor), a video processor, a signal processor, a display and a memory.

Correspondingly, the processor that executes the neural network may comprise any suitable processor that is capable of doing that, such as a central processing unit (CPU), a graphics processing unit (GPU) (graphics processor), a video processor, a sound processor, an image signal processor (ISP), a digital signal processor, and a Neural Network Accelerator/Processor (Neural Processor Unit) (NPU).

The data processing system is in an embodiment implemented on (as part of) an electronic device. Thus the technology described herein also extends to an electronic device that includes the data processing system of the technology described herein (and on which the data processing system operates in the manner of the technology described herein). The electronic device is in an embodiment a portable and/or lower powered device, such as a mobile phone or tablet.

The memory in which the data relating to the neural network processing is stored may comprise any suitable memory of the data processing system, such as a main memory of the data processing system.

In an embodiment, the data processing system also includes further storage (memory) that is "local" to the processor, in which data can be stored for use by the processor when executing a neural network, rather than having to access data from the (main) memory. Hence, the data processing system may comprise both local (e.g. on-chip) and main (e.g. external) memory.

The technology described herein may be used in conjunction with any suitable and desired neural network. In embodiments, the neural network is a convolutional neural network.

The neural network in an embodiment comprises one or more, and in an embodiment a plurality, of layers, which operate in turn, e.g. such that the output data for one layer becomes the input layer for a next layer. The layers of the neural network may, and in an embodiment do, comprise one or more convolutional layers, pooling layers and/or fully connected layers.

The neural network can be being used for any form of neural network processing, such as to generate a (useful) output as may be output during inferencing by the neural network, but also during training of the neural network, or any other operation of a neural network that includes performing matrix-vector multiply operations.

An (input) data array that is being processed by the neural network may comprise any suitable input data array which can be processed by a neural network to produce a useful output. For instance the input data array may comprise, an image, an image from an Image Signal Processor (ISP), an image frame from video data, sound data or voice data, or other input data. Correspondingly the neural network may be operable to identify or classify features present within the input data array, e.g. such as objects in an input image, or sound features in input sound data.

The technology described herein relates to the performance of matrix-vector multiply operations when performing neural network processing. The technology described herein can be used whenever matrix-vector multiply operations are being performed during neural network processing. Thus, for any given neural network being executed, the operation in the manner of the technology described herein can be, and in an embodiment is, used for some, and in an embodiment all, of the matrix-vector multiply operations that are performed during execution of the neural network in question.

Correspondingly, the matrix-vector multiply operation that is being performed in the technology described herein can be any suitable and desired matrix-vector multiply operation for neural network processing. It is in an embodiment an operation that multiplies an input vector(s) with a weight matrix (and so the matrix of data values is in an embodiment a matrix of weight values).

In an embodiment, the matrix-vector multiply operation is such an operation for a fully connected layer of a neural network that the processor is executing.

In an embodiment, the matrix-vector multiply operation is being used as part of and for a matrix-vector multiply accumulate operation, i.e. to perform a weighted sum of the data values of an input vector to generate a data point of an output data array.

In an embodiment, the matrix-vector multiply operation is such an operation for a (layer of a) convolutional neural network (CNN) or (a layer of) a recurrent neural network (RNN) (such as for a cell of an RNN, such as for a LSTM (long short-term memory) or GRU (gated recurrent unit) cell).

Other arrangements would, of course, be possible.

The (each) input vector can represent any suitable and desired set of data to be processed. In the case of a CNN, the input vector(s) may, and in an embodiment do, comprise the outputs of preceding convolutional filters, and so would comprise a convolutional feature detector results. Also, in the case of a neural network comprising multiple fully connected layers, then the input (vectors) to a subsequent fully connected layer could accordingly comprise the output of a preceding fully connected layer. In the case of an RNN for audio, for example, the input vector(s) could comprise Mel-frequency cepstral coefficients (MFCCs). Other arrangements would, of course, be possible.

The (each) input vector can comprise any suitable and desired number n of data positions. Typically and in an embodiment, the (and each) input vector comprises a plurality of data positions (so n will be an integer greater than 1). The (and each) input vector may comprise, for example from 512-8192, such as 4096, data positions.

The, e.g. weight, matrix similarly can comprise any suitable and desired matrix (array) of data, e.g. weight, elements to be used in a matrix-vector multiply operation for a neural network. The matrix should, and in an embodiment does, comprise respective sets of data values, corresponding to the size of the input vector(s). Thus the matrix will comprise n×m (or m×n) data positions (data elements), corresponding to the input vector size of n data positions, and containing a set of m data values (e.g. weight values) for each input vector data position (corresponding to the output vector size of m data positions).

The set of one or more input vectors to be subjected to the matrix-vector multiply operation may comprise any suitable and desired number of input vectors.

In one embodiment, the set of one or more input vectors comprises a single input vector. In this case therefore, data positions in that single input vector having a non-zero value will be identified, and then multiplied by the appropriate weight matrix values. In this case, the input vector data positions having non-zero values (or conversely having a value of zero) can be identified in any suitable and desired manner, for example by comparing the value of each input vector data position with zero.

In other embodiments, the set of one or more input vectors comprises a plurality of input vectors. In this case the set in an embodiment comprises less than or equal to 32 input vectors, and in an embodiment less than or equal to 8 input vectors. Thus in an embodiment, a set size of 2-8 or 4-8 input vectors is used. Each input vector in the set should, and in an embodiment does, have the same number, n, of data positions.

Where the set of input vectors comprises plural input vectors, the plural input vectors in the set can be selected as desired. In an embodiment, the input vectors relate to and comprise (e.g. unrelated) inputs that can be passed through the neural network simultaneously (for example as will be the case when performing "batching" in neural network processing).

In the case where the set of input vectors comprises plural input vectors, then the input vector data positions having a non-zero value in at least one of the input vectors in the set (or conversely, the data positions for which the value is zero for all of the input vectors in the set) can again be determined and identified in any suitable and desired manner, for example by comparing the value of each input vector data position in each input vector in the set with zero. In an embodiment, the data values of the input vectors in the set for a respective data position are ORed with each other to determine whether any of the input vectors have a non-zero value for the data position in question (and this is done for each data position to identify any data positions for which at least one of the input vectors in the set has a non-zero value).

Other arrangements would, of course, be possible.

The technology described herein operates to identify a set of one or more data positions in the input vector(s) having non-zero values, and then fetch the weight values for those non-zero data positions and perform the matrix-vector multiply operation for those non-zero data positions. It would be possible in this regard to consider all the data positions in the input vector(s) together, and identify all the data positions in the input vector(s) that have non-zero values, in an initial operation, and then fetch the weight values and perform the matrix-vector multiply operation accordingly (once all the non-zero positions in the input vector(s) have been identified). This may be appropriate where the input vectors comprise relatively few data positions.

In an embodiment, a set of up to a particular, in an embodiment selected, in an embodiment predetermined, maximum number of data positions having non-zero data values is identified and then processed (as a single operation). In an embodiment, the maximum number of non-zero data value positions that is identified and then processed corresponds to the maximum number of matrix-vector multiply operations that the data processor can perform in parallel. For example, and in an embodiment, the data processor may comprise processing circuits (logic) operable to perform, e.g., p matrix-vector multiply operations in parallel, and in that case, the operation in the manner of the technology described herein will in an embodiment operate to identify a set of up to p input vector data positions having non-zero values for processing together.

In an embodiment, a set of up to 4, in an embodiment of 2-4, data positions having non-zero values is identified and then processed together in the manner of the technology described herein.

The Applicants have recognised in this regard that where the input vectors comprise large numbers of data positions (as discussed above), but the data processor is only able to perform matrix-vector multiply operations in parallel for a limited number of data positions, then it is likely to be the case that not all of the input data positions having non-zero values in the input vector(s) can be processed in parallel in one operation. Thus, in an embodiment, the operation in the manner of the technology described herein will operate to identify (plural) successive sets of one or more input data positions having non-zero data values for the set of input vector(s) being considered, and to process each of those sets of input data positions having non-zero data values separately, e.g., and in an embodiment, one after another, until all of the data positions in the input vector(s) have been considered and processed (as required).

This operation could be performed as desired. For example, the process could operate to scan the input data positions in sequence until an appropriate set of data positions (e.g. p data positions) having non-zero values has been identified and then process that set of data positions, and then continue scanning the next input vector data positions in the sequence until another suitable set of data positions having non-zero values has been identified for processing, and so on.

Alternatively, the operation could scan a plurality of successive portions (chunks) of data positions of the input vector(s) in turn (one after another) (with each such portion comprising a particular, in an embodiment selected, in an embodiment predetermined, and in an embodiment the same, number of data positions in the input vector(s)), and identify any data positions within a portion (chunk) of data positions having non-zero values (and then process those data positions accordingly) (and then process the next such portion (chunk) of data positions in the data position sequence, and so on), until all of the data positions in the input vector(s) have been considered.

Once a set of one or more data positions for the input vector(s) having non-zero values has been identified, then the data values from the matrix for those data positions are fetched from memory The fetching of the weight matrix values for the input vector data positions having non-zero values can be performed in any suitable and desired manner, such as, and in an embodiment, in accordance with the data fetching arrangement and protocol for the data processing system in question.

It will be appreciated that in accordance with the operation in the manner of the technology described herein, the, e.g. weight, matrix values are fetched (solely) for those data positions in the input vector(s) identified as having non-zero values.

On the other hand, where the data value for a given data position is zero in of the input vectors in the set, then the matrix values for that "all zero" data position will not be fetched (and no matrix vector multiply operation will be performed for that "all zero" data position). In other words, for any data positions where all of the input vectors in the set have a value of zero for that data position, then the fetching of the set of matrix values for those "all zero" data positions (and the performance of the matrix vector multiply operation for those data positions) will be omitted (skipped).

Thus, the operation in the manner of the technology described herein comprises skipping (omitting) the fetching of any matrix values (and skipping (omitting) the performance of any matrix-vector multiply operations) for any data positions of the input vectors in the set of input vectors being considered, for which the data value is zero for all the input vectors in the set.

Correspondingly, in an embodiment, the operation in the manner of the technology described herein comprises only fetching the matrix values (and only performing the matrix-vector multiply operations) for any data positions of the input vectors in the set of input vectors being considered, for which the data value is non-zero for at least one of the input vectors in the set; and skipping (omitting) the fetching of any matrix values (and skipping (omitting) the performance of any matrix-vector multiply operations) for any data positions of the input vectors in the set of input vectors being considered, for which the data value is zero for all the input vectors in the set.

The matrix of data values (e.g. weight matrix) is in an embodiment stored in memory in such a manner as to facilitate fetching only the matrix values for particular input vector data positions.

To do this, in an embodiment, the matrix is stored such that all of the set of matrix (e.g. weight) values for a given input vector data position are stored together (contiguously) in the memory (and such that they can be read as a contiguous block of memory addresses). Thus the matrix is in an embodiment stored in memory as successive (complete) blocks (sets) of respective input data position (input channel) data (e.g. weight) values.

Thus the matrix values are in an embodiment stored column by column (or row-by-row, as appropriate) so as to provide contiguous sets of stored data that correspond to the matrix values for a given input vector data position.

This then facilitates reading the required matrix values for a given input vector data position in appropriate bursts (and as appropriate blocks) efficiently from memory, as the matrix data values for the data positions for which the matrix data values are required can be read as contiguous blocks of data from the memory (and correspondingly has the effect that for any input data position where all the data values are zero, the loading of a contiguous set of matrix elements can be skipped).

This then facilitates more efficiently reading the required values from the matrix from memory. This may be particularly the case where the matrix is stored in a compressed form (and in particular in a block-based compressed form), as in that case it may be necessary to read a minimum amount of data from the memory in order to recreate a block of data elements from the matrix. By storing the matrix in memory as respective input vector data position data value sets (blocks), the loading and decompressing blocks of data that correspond to respective sets of matrix elements for respective input vector data positions is further facilitated.

The matrix may be stored in an uncompressed or compressed form, as desired. In the case where the matrix is stored in a compressed form, then any suitable and desired compression scheme can be used.

In the case of a fixed-rate compression scheme, then the size of each set of data position matrix values (of each matrix column) in memory will be fixed (and the same), and so the matrix values can be fetched on that basis (this will also be the case where the matrix is stored in an uncompressed form).

On the other hand, in the case of a variable rate compression scheme, appropriate metadata, such as pointers indicating the beginning of each set of data position matrix values (of each matrix column), and/or data indicating the size of each set of data position matrix values (of each matrix column), in memory may be provided to facilitate fetching individual sets of data position matrix values (matrix columns) from the memory (and, correspondingly, the skipping of the fetching of individual sets of data position matrix values (matrix columns) when fetching the matrix data from memory).

Once the set(s) of matrix data values for the identified non-zero input vector data positions have been fetched, the matrix-vector multiply operation using the fetched matrix values and the input vector values for the non-zero data positions can be, and is in an embodiment, performed.

Subject to the operation in the manner of the technology described herein, the matrix-vector multiply operation can be performed in any suitable and desired manner, such as, and in an embodiment, in accordance with the normal operation for performing such operations in the neural network and for the processor executing the neural network, in question.

Thus, the input vector values for the data positions in question are multiplied by corresponding matrix values for the input vector data positions in question to provide the appropriate matrix-vector multiply output(s) for the input vector in question.

Thus, in an embodiment, for each input vector, the values of that input vector for each data position identified as having a non-zero value in at least one of the input vectors in the set will be multiplied by one or more corresponding groups of matrix values for those input vector positions (depending on how many matrix values there are in the sets of matrix values for a given input vector position), with each corresponding group of matrix values comprising the corresponding matrix value from each separate set of matrix values for the identified "non-zero" input vector data positions.

The matrix-vector multiply operation in an embodiment comprises a matrix-vector multiply accumulate operation, i.e. such that the results of multiplying the data values for an input vector for each data position identified as having a non-zero value in at least one of the input vectors by the corresponding matrix values are accumulated to provide an accumulated sum for the input vector in question. In other words, the matrix-vector multiply operation is in an embodiment used to provide a weighted sum for a (and each) input vector (a set of one or more weighted sums for a (and each) input vector).

Where a set of plural input vectors is being considered, then the matrix-input vector data position multiply operation should be, and is in an embodiment, performed for each input vector in the set separately.

Other arrangements would, of course, be possible.

Where, as discussed above, the matrix-vector multiply operations are performed for a set of input vector(s) by performing matrix-vector multiply operations separately for plural respective sets of data positions in the input vector(s) having non-zero values, then the results from processing each separate set of non-zero data positions are in an embodiment appropriately combined, to provide an overall output result for each input vector in its entirety.

In this case, the results from processing each separate set of non-zero data positions can be combined in any suitable and desired manner to provide an overall output result for the input vector in question, for example, and in an embodiment, in dependence upon and in accordance with the processing operation that the matrix-vector multiply operation is being used to perform.

For example, where the matrix-vector multiply operations are being used to provide an accumulated (weighted) total (sum) of all the data positions in an input vector, the results for each set of non-zero data positions for an input vector can be, and are in an embodiment, combined by accumulating the results from each set to provide the overall output accumulated result (sum) for the input vector as a whole.

In this case therefore, for a (and each) input vector in the set of input vector(s), each separate set of non-zero data positions will be subjected to the matrix-vector multiply operation and the results for each individual data position in the set accumulated to provide a weighted sum (total) for the input vector for the set of non-zero data positions in question. The corresponding weighted sums for each separate set of non-zero data positions being considered can then be, and are in an embodiment, added together, to provide an overall weighted sum for the input vector in question in its entirety.

To facilitate this, in an embodiment, the processor comprises and/or has access to, an appropriate accumulation buffer (which is in an embodiment provided by local-on-chip storage), in which the results of the matrix-vector multiply operations for each respective set of non-zero data positions (and for each respective input vector) can be accumulated in turn.

In this case therefore, the processor will perform a matrix-vector multiply operation and accumulate the total for a first set of non-zero data positions in an input vector for that input vector in the accumulation buffer, and then perform the matrix-vector multiply operation for the next set of non-zero data positions for the input vector and add the sum of those operations to the value in the accumulation buffer for the input vector, and so on, until all the sets of non-zero data positions for the input vector have been processed and their output values accumulated. The final, accumulated values for the input vector(s) can then be written out, e.g. to memory, for further processing.

Other arrangements would, of course, be possible.

The output of the matrix-vector multiply (and, e.g., accumulate) operation can be used as desired. It is in an embodiment provided as a set of data (a data array/feature map) to be subjected to further processing by the neural network, for example, and in an embodiment, as an input (feature map) for a next layer of the neural network. It may, e.g., be written out to storage, e.g. main memory, for this purpose.

The data processing system may comprise and/or be in communication with one or more memories (such as the memories described above) that store the data described herein, and/or store software for performing the processes described herein. The data processing system may be in communication with a host microprocessor, and/or with a display for displaying output data associated with the neural network processing.

The data processing system of the technology described herein may be implemented as part of any suitable system, such as a suitably configured micro-processor based system. In some embodiments, the technology described herein is implemented in a computer and/or micro-processor based system. The data processing system may be a microprocessor, a programmable FPGA (Field Programmable Gate Array), etc.

The various functions of the technology described herein may be carried out in any desired and suitable manner. For example, the functions of the technology described herein may be implemented in hardware or software, as desired. Thus, for example, the various functional elements and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program comprising computer software code for performing the methods herein described when the program element is run on a data processor, and a computer program comprising code configured to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a data processing system 100 which may be used in conjunction with the technology described herein. The system 100 comprises a System on Chip (SoC) system 110. Part of the data processing system which may be on chip comprise an image signal processor (ISP) 102, a video decoder 103, an audio codec 104, a CPU 105 and a neural network processor (NPU) 106, which may be operably connected to a memory controller 108 by means of a suitable interconnect 107. The memory controller 108 may have access to external, off-chip memory 109. A sensor 101 may provide input data for the system 100 (e.g. video data and/or sound data from a suitable camera or microphone or other sensor device). Although the CPU and NPU are shown separately in FIG. 1, the neural network could be executed by the CPU or GPU, if desired.

Figure 2:
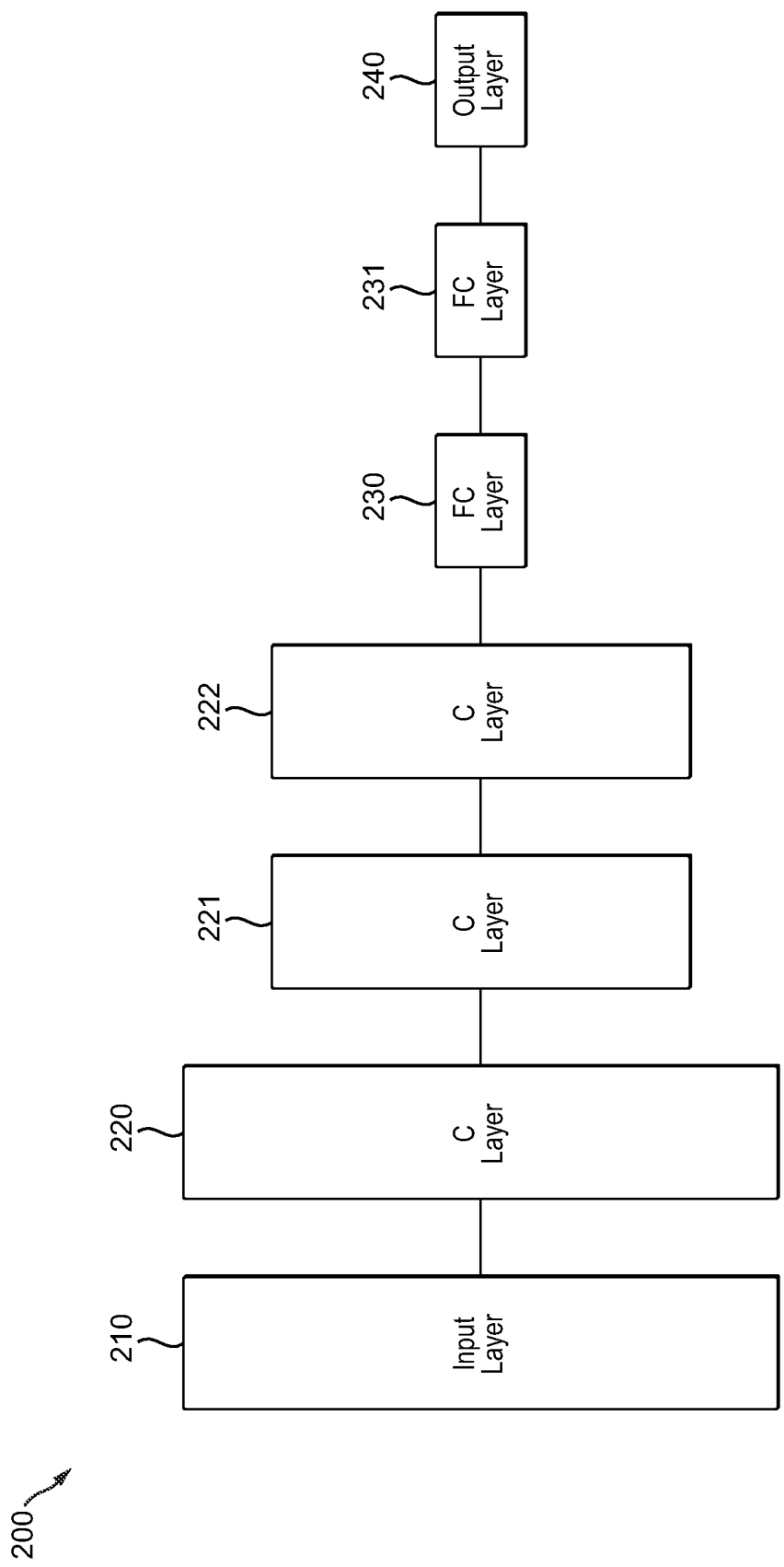

FIG. 2 shows schematically a neural network 200 that the technology described herein may be used for. The neural network may be any suitable type of neural network. In the present embodiments, the neural network is a convolutional neural network (CNN), which is the type of neural network shown in FIG. 2. The CNN comprises a number of layers which operate one after the other, such that the output from one layer is used as the input for a next layer.

The CNN shown in FIG. 2 comprises an input layer 210. The input layer may be adapted to receive an input data array (e.g. comprising data corresponding to image or sound data). The input layer may comprise a number of processing nodes (or "kernels") which receive an input data array and pass that data array on to the next layer of the neural network.

The next layer shown in FIG. 2 is a convolutional layer (C-Layer) 220. The convolutional layer may generate a feature map which comprises a representation of features that were present in the data array that was provided to the convolutional layer.

A pooling layer may also be provided after the convolutional layer (in FIG. 2 these are both incorporated into the convolutional layer, although it is to be understood that they can comprise separate layers). The pooling (or "downsampling") layer may operate to reduce the size of a data array (e.g. feature map) that is input into the pooling layer. Hence, as shown in FIG. 2, successive convolutional layers may be smaller since they are processing smaller data arrays. The pooling layer may produce (output) a data array (e.g. a further feature map) which is an "equivarient" representation of the data array that was input into the pooling layer (meaning that the representation is almost invariant to changes in the scale and position of features in the data array that was input into the pooling layer).

After one or more convolutional layers 220, 221, 222 the neural network may comprise one or more fully connected (FC) layers 230, 231. The fully connected layers may operate on a data array (e.g. feature map) generated by the convolutional and/or pooling layers. The one or more fully connected layers may operate one after the other such that the data that is output from one fully connected layer is used as the input data for a next fully connected layer. The final fully connected layer may produce a final output data array or output data set which may comprise a useful output (e.g. an identification or classification of an object in the image data that was originally received by the input layer of the CNN).

The final fully connected layer 231 passes the useful output to the output layer 240 of the neural network. The output layer 240 comprises a number of processing nodes which receive the useful output data and pass the useful output data on towards other components of the data processing system which are outside of the neural network (e.g. such as further processing and display components which can display the output data, for example).

Although FIG. 2 shows a certain number of convolutional and FC layers, the neural network may comprise fewer or more such layers if desired (and may also or instead comprise other layers which operate in a different manner to the convolutional and FC layers).

Figure 3:
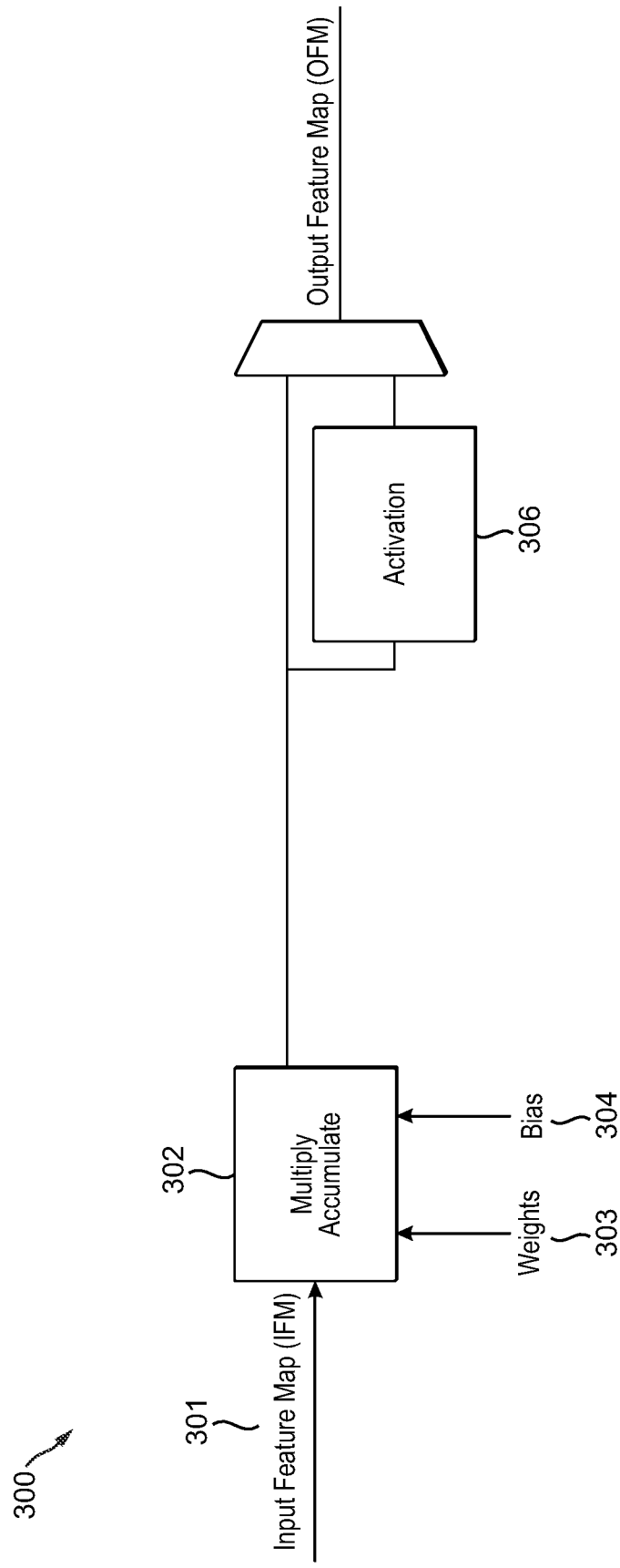
FIG. 3 shows schematically the operation of a convolutional layer of a neural network.

FIG. 3 shows schematically the operation of a convolutional layer 300 of a neural network. The convolutional layer operates on a data array 301 which is shown to be an input feature map (IFM), (which may have been received from a previous convolutional layer as discussed above).

The convolutional layer performs an operation to modify the data array in order to produce (output) a modified data array (e.g. feature map). The operation may require parameter information to be read from memory.

In the case shown in FIG. 3, the convolutional layer performs a multiply accumulate operation 302. The multiply accumulate operation 302 may use parameter information may comprises weights 303 (e.g. a weight array) and a bias 304, which may be read from local or main memory.

Generally speaking, the weights will have been selected to extract or identify certain features within the input data set, such as e.g. edges in an input image.

Generally, a multiply accumulate operation may comprise performing a weighted sum of a selection of points from the data array (e.g. feature map). The selected points may be referred to as a "receptive field" or a "window". The weights for the weighted sum may also be referred to as a "filter" or "kernel". Each data point of the output feature map may be generated using a multiply accumulate operation as follows:

$$Y=w1.X1+w2.X2 \ldots +w1.Xn+b$$

wherein Y is an output data point, where X1 to Xn are input data from input data points, where w1 to wn are associated weights, and where b is a bias that is added.

When the convolutional layer is executing, the array of weights may be "slid" (or "convolved") over the input data array (e.g. image or input feature map) one data point at a time, so as to build up an array of data points for the output feature map.

A convolutional layer may perform plural multiply accumulate operations, each using a different set of weights, to generate plural output feature maps which extract or identify different features. If a convolutional layer receives plural input feature maps, each multiply accumulate operation may act (perform a weighed sum) across all of the input feature maps.

An activation operation 306 may or may not also be applied. The activation operation 306 may comprise applying a non-linear function (referred to as an "activation function") to the data points of the data array that is generated by the multiply accumulate 302 operation. The activation function may comprise a ReLU, sigmoid or tan h(x) function, or any other suitable function.

Figure 4:
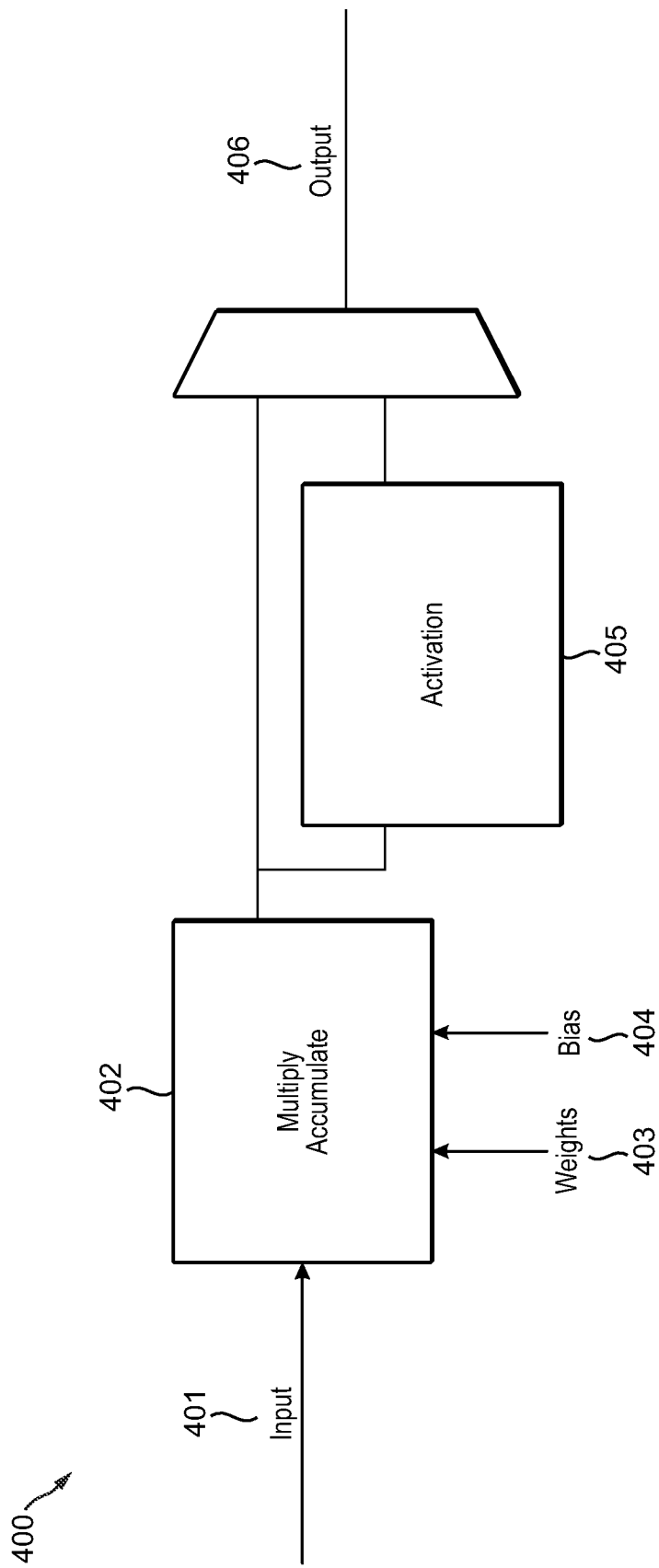
FIG. 4 shows schematically the operation of a fully connected layer of a neural network.

FIG. 4 schematically shows the operation of a fully connected (FC) layer 400 of a neural network, according to an embodiment. The FC layer 400 may take as an input 401, a feature map that was generated by a previous convolutional layer, or an input data array that was generated by a previous FC layer. The FC layer 400 may perform a multiply accumulate operation 402 (using weights 403 and bias 404 which may be read from local or main memory) on the data array that is input into the FC layer 400. The FC layer 400 may or may not also perform an activation operation 405 e.g. using a suitable non-linear activation function. The FC layer may produce an output 406 (e.g. a data array) which may be used by a next FC layer or an output layer, as discussed above.

Figure 5:
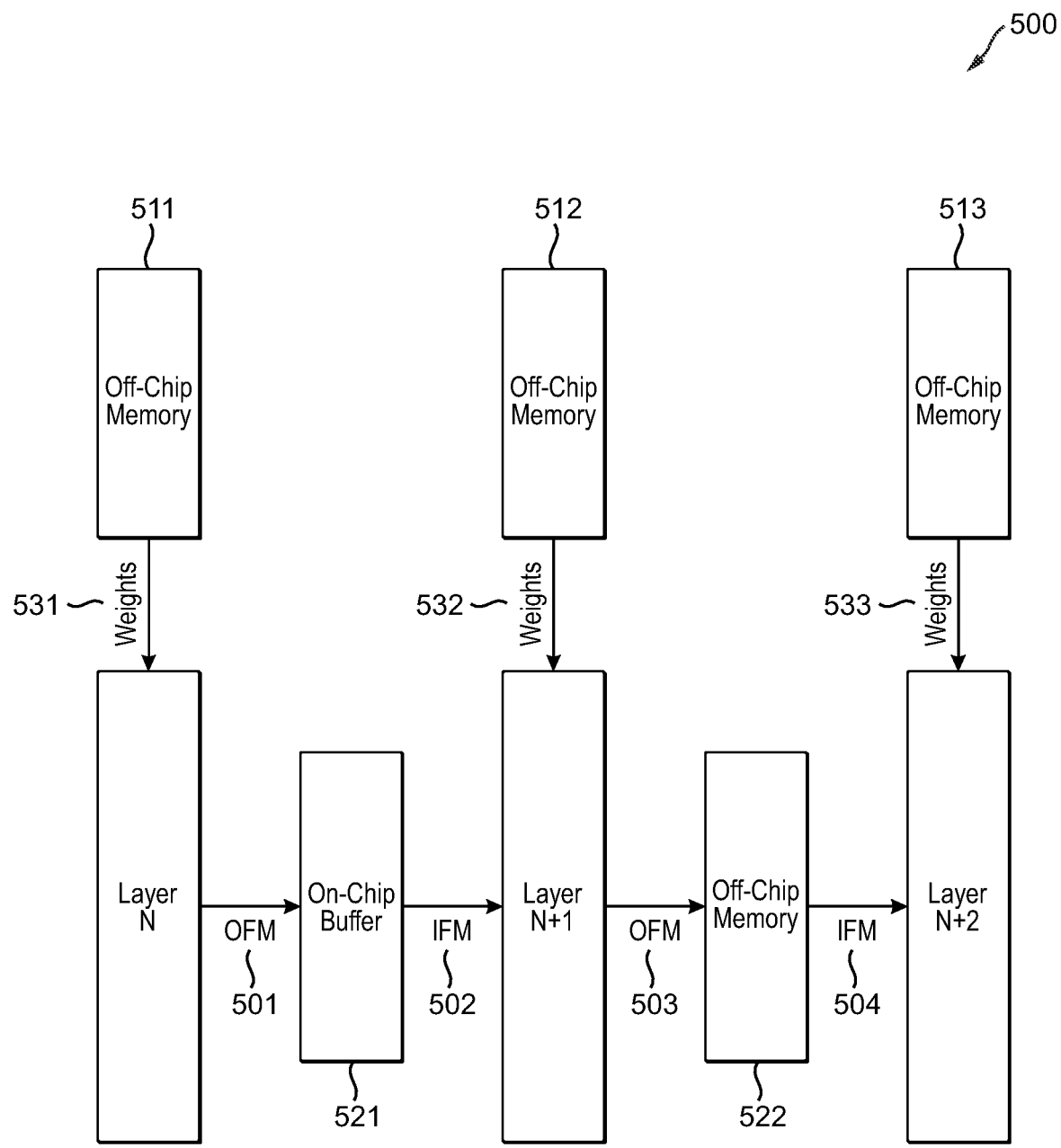
FIG. 5 shows schematically a data flow for the layers of a neural network.

FIG. 5 shows schematically a data flow for the layers of the neural network. The neural network comprises multiple layers N, N+1 and N+2. In the embodiment shown in FIG. 5, layer N generates a data array which comprises an output feature map (OFM) 501, which is small enough to be stored on local memory (on-chip buffer 521). Layer N+1 then reads the data array as an input feature map 502 from the on-chip buffer 521.

Layer N+1 generates another data array which comprises another output feature map (OFM) 503. However, in the case shown, OFM 503 is too large to be stored in local memory, so OFM is stored in main memory (off-chip memory 522).

When the next layer N+2 requires the data array from layer N+1 as an input feature map 504 for the neural network processing performed by layer N+2, then the data array must accordingly be read from off-chip memory.

As shown in FIG. 5, each of the layers N, N+1, N+2 may read processing parameters comprising weights 531-533 (or weight arrays) from main (off-chip) memory 511-513. Although FIG. 5 shows the weights being read directly from off-chip memory, in embodiments, the weights are first read into local (on-chip) memory for use by the layers. For instance, blocks of data representing regions of weight arrays (or portions of the weight data) may be read into local memory.

In an embodiment, the off-chip memories 511-513 and 522 are the same off-chip memory.

Figure 6:
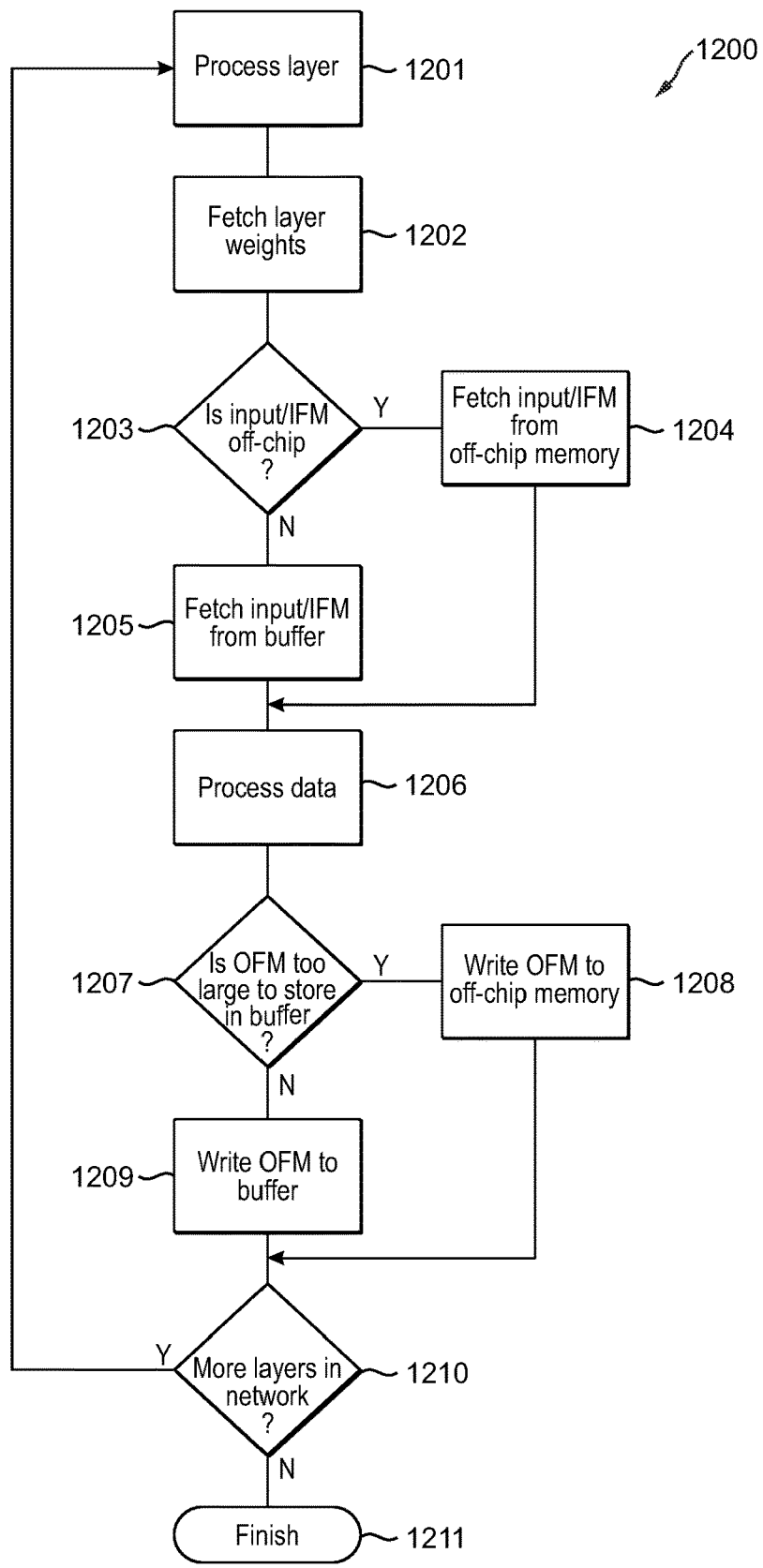
FIG. 6 is a flow chart for neural network processing.

FIG. 6 is a flow chart showing an example of neural network processing. Each loop through the flow-chart corresponds to the processing performed when executing a layer of the neural network.

At 1201 processing commences for the layer (which is, for example, a convolutional layer). At 1202, weights (e.g. a weight array) that are required for the neural network processing are fetched. An input data array or input feature map (IFM) also needs to be fetched for the neural network processing which is to be performed by the layer.

The data processing system performs processing using data arrays that are stored in local (on-chip) memory. If a required data array is not present in the local (on-chip) memory it may need to be read from main (off-chip) memory into local (on-chip) memory for use during neural network processing. Hence, at 1203, a determination is made as to whether or not the input data array or IFM is stored in main (off-chip) memory 1203. If the input data array or IFM is stored in off-chip memory, then the processing proceeds to fetch the input data array or IFM from off-chip memory 1204. If not, then the processing proceeds to fetch the input data array or IFM from the local (on-chip) buffer 1205.

At 1206 the input data array or IFM is then processed using the weight array that has been fetched. The processing generates a data array that corresponds to an output feature map (OFM).

The data processing system may preferentially try to store data in the local (on-chip) memory if there is sufficient space. Hence, at 1207 a determination is made as to whether the OFM is too large to store in the local (on-chip) buffer. If the OFM is too large to store in the local (on-chip) buffer, then the OFM is written to main (off-chip) memory 1208. If not, then the OFM is written to the local (on-chip) buffer 1209.

This completes the processing for that particular layer of the neural network.

It is then determined at 1210 whether there are more layers in the neural network for which neural network processing is to be performed. If there are more layers, then the processing proceeds to the next layer in the neural network, (i.e. the process returns to starting point 1201 and the processing outlined in the flow chart is repeated for the next layer of the neural network). If there are no more layers in the neural network for which the processing shown in the flowchart is applicable (e.g. if only an output layer of the neural network remains) then the process finishes.

Figure 7:
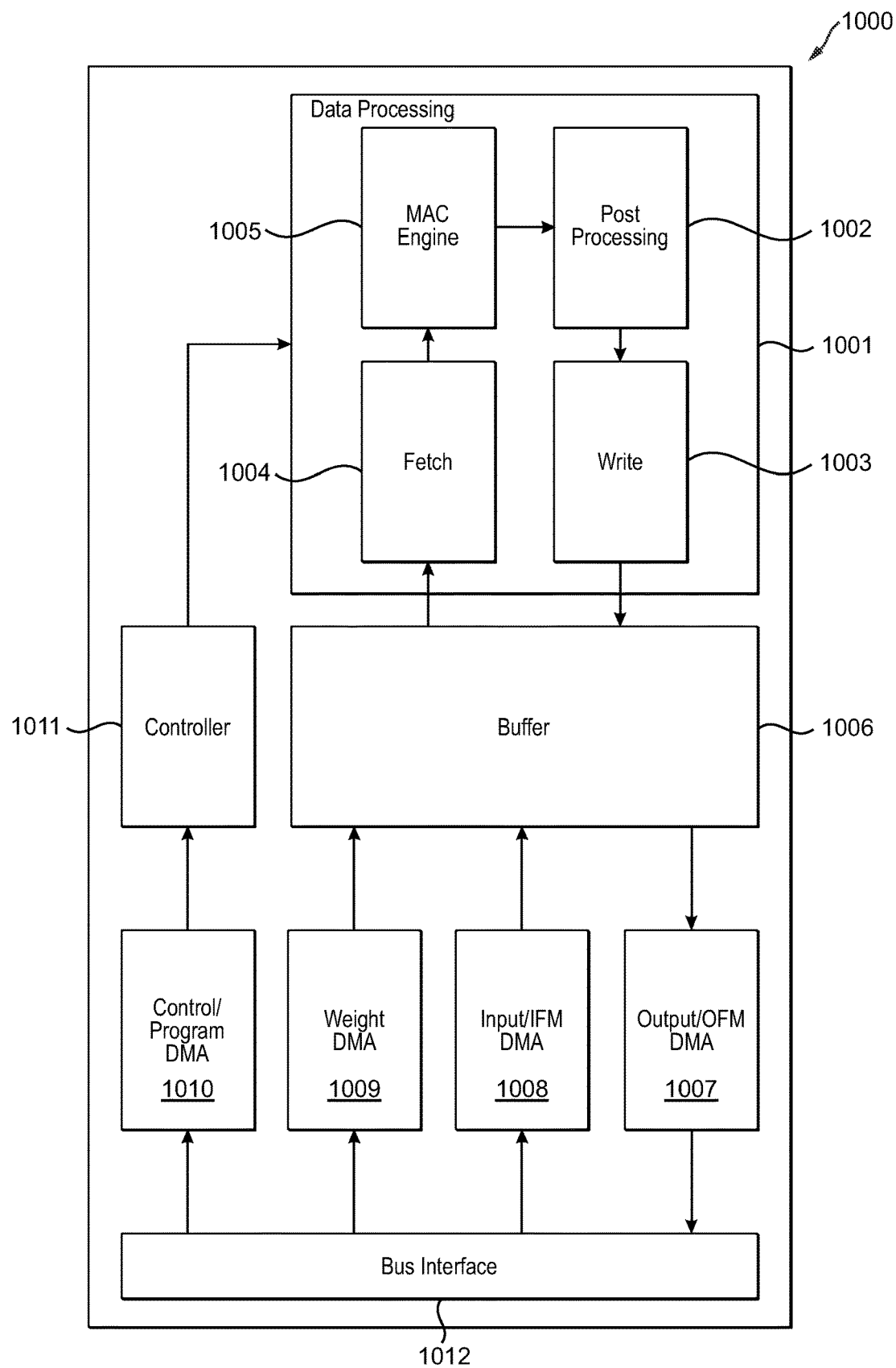
FIG. 7 is a schematic diagram of a data processing system operable to execute a neural network.

FIG. 7 is a schematic diagram of a data processing system 1000 operable to execute neural network processing (such as described with respect to FIG. 6).

The data processing system 1000 comprises a number of on chip components such as data processing circuits 1001 which performs the neural network processing (e.g. using a post processing unit 1002). The data processing circuits 1001 may comprise a fetch circuit 1004 for fetching data (e.g. corresponding an input data array or a feature map) from a buffer (local, on-chip memory) 1006. The data processing circuit 1001 may comprise a write circuit 1003 for writing data (e.g. corresponding data arrays such as output feature maps) to the local memory (buffer 1006). The data processing circuits 1001 may also comprise a MAC (multiply-accumulate) Engine (circuit) 1005.

As discussed above, the data that is required for (or generated by) the neural network processing (e.g. such as input feature maps, output feature maps, weights arrays, biases, and other program control data) may be stored in off-chip memory (not shown).

The data that is stored in the off-chip memory may need to be loaded into local (on-chip memory) 1006 before it can be used for neural network processing. The data processing system 1000 therefore comprises an output feature map (OFM) direct memory access (DMA) unit 1007, an input feature map (IFM) direct memory access (DMA) unit 1008, a weight array direct memory access (DMA) unit 1009 and a control/program direct memory access (DMA) unit 1010. The DMA units 1007-1010 are operable connected to the on-chip memory (buffer 1006) and to main off-chip memory via a bus interface 1012.

A controller 1011 may also be provided for controlling the data processing circuit 1001 for executing the neural network.

Figure 8:
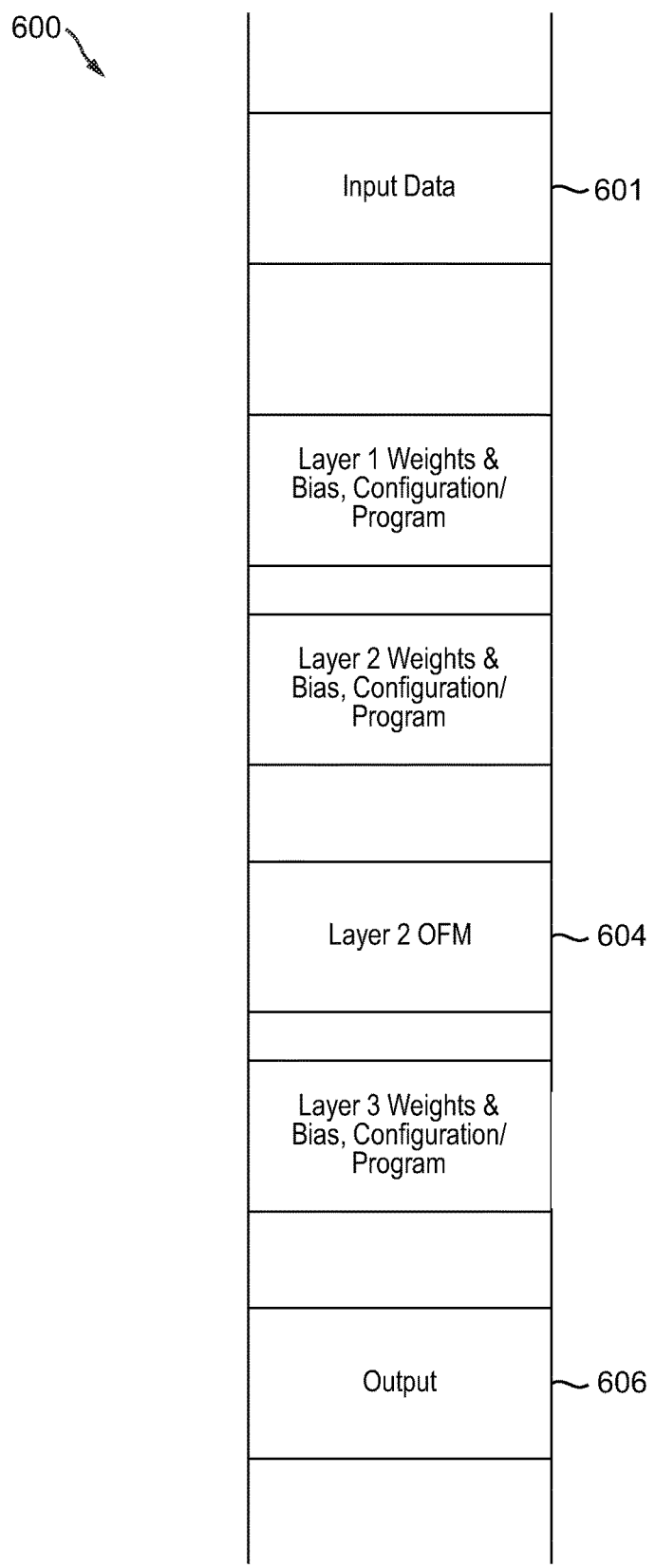
FIG. 8 shows the contents of main (off-chip) memory for a data processing system executing a neural network.

FIG. 8 shows an example of the contents of main (off-chip) memory for a data processing system that is executing a neural network. The contents of the off-chip memory comprise input data 601 which may be used an input data for a first layer (Layer 1) of the neural network. In the particular example shown, the weights (weight array), bias, and configuration/program information for the layers of the neural network (Layer 1, Layer 2 and Layer 3) are also held in the off-chip memory. It can be seen that no output feature map has been written to off-chip memory for Layer 1. This is because that output feature map was small enough to be stored locally instead (as discussed previously).

However, it can be seen that the output feature map 604 from Layer 2 (which is too large to be stored locally) is stored in the off-chip memory.

The off-chip memory also stores output data 606, which may comprise, for example the output feature map from Layer 3.

The technology described herein relates in particular to the performance of matrix-vector multiply operations when executing a neural network, such as may be performed for fully connected layers as discussed above with reference to FIG. 4.

In the present embodiments, and in accordance with the technology described herein, when performing a matrix-vector multiply operation to multiply a set of one or more input vectors with a corresponding matrix, it is first determined for the set of one or more input vectors which data positions in the input vectors have non-zero values, and then only the weight values for those input vector data positions having non-zero values are fetched from memory and used to perform the appropriate matrix-vector multiply (and accumulate) operation.

Figure 9:
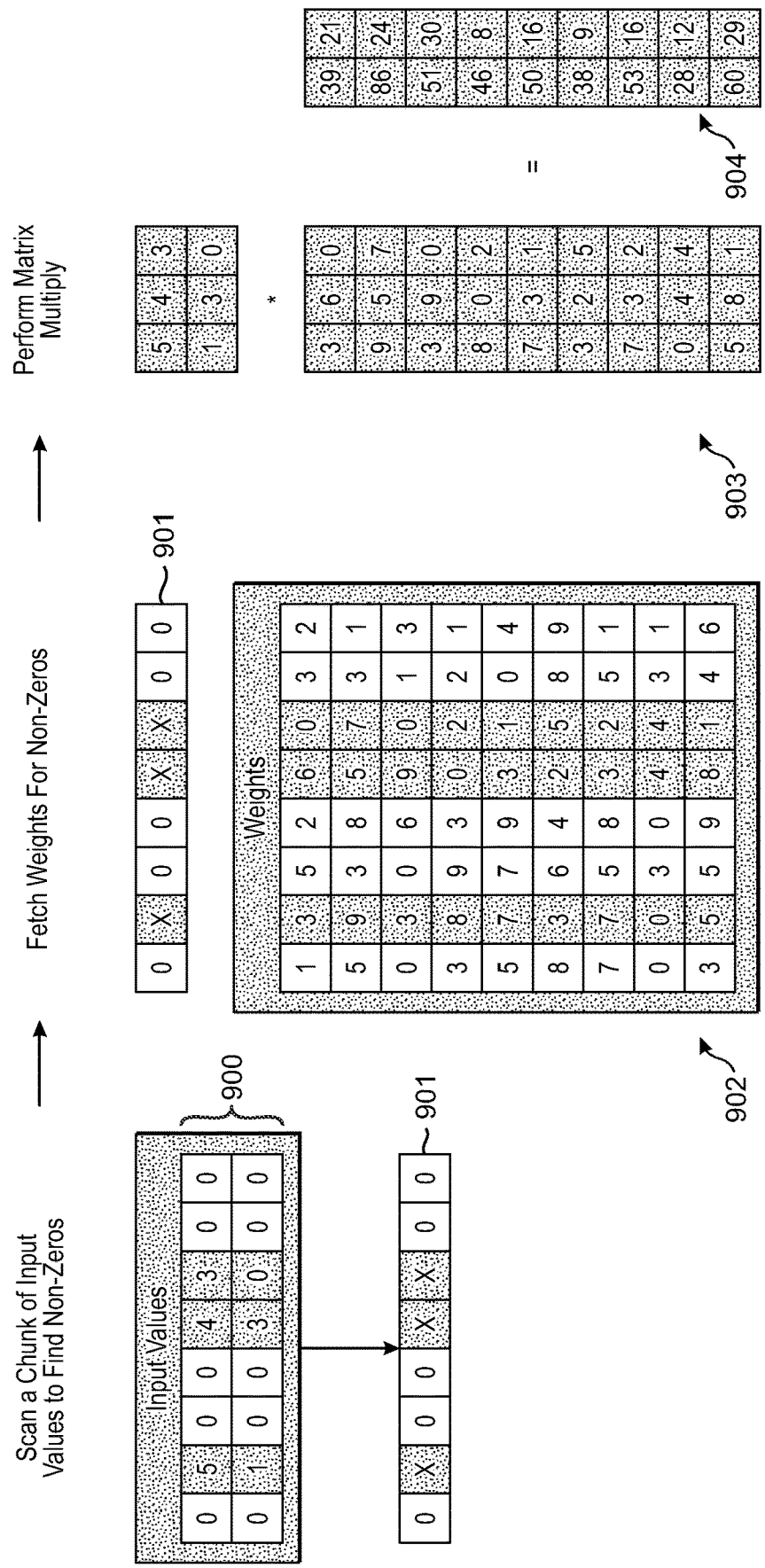
FIG. 9 shows schematically the performing of a matrix-vector multiply operation in an embodiment of the technology described herein.

FIG. 9 illustrates this, and shows the identification 901 of data positions for, in this case, a set of two input vectors 900, for which at least one of the input vectors has a non-zero value. This may be done, for example, by ORing the values of each input vector for the respective data positions together, to identify those input vector data positions for which at least one of the input vectors has a non-zero value.

Then, as shown in FIG. 9, (only) the sets of weight matrix values for the input vector data positions 901 identified as having at least one non-zero value are fetched 902, and the appropriate matrix-vector multiply accumulate operation is performed for the input vector data positions having non-zero values with the fetched weight values 903, to provide the appropriate multiply accumulate results 904 for the input vector data positions that have at least one non-zero value.

(It will be appreciated in this regard, that the multiply accumulate results 904 provided by performing the multiply accumulation operation for those data positions identified as having non-zero values corresponds to the result of performing the multiply accumulate operation for all the input data positions, including those which have a value of zero, and so performing the operation using only for those input positions that are identified as having non-zero values suffices to provide the desired output result of the multiply accumulate operation.)

Figure 10:
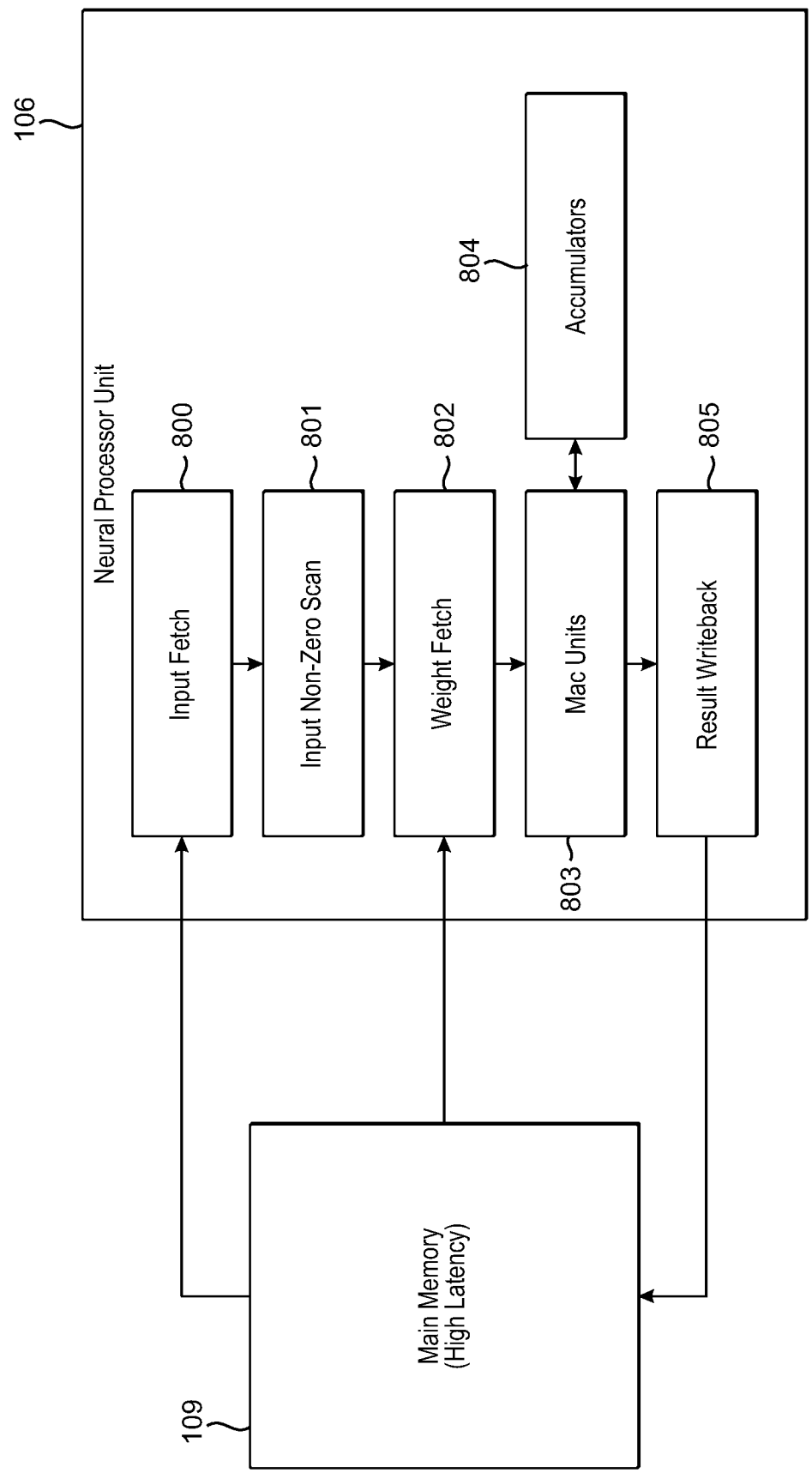
FIG. 10 shows schematically the operation of a neural network processor when performing a matrix-vector multiply operation in an embodiment of the technology described herein.

FIG. 10 shows the corresponding operation of the neural processor unit (NPU) 106 when operating in this manner.

Thus, as shown in FIG. 10, the neural processor unit 106 will first fetch the set of one or more input vectors to be processed from the memory 109 (step 800). It will then scan the input vectors to identify a set of one or more data positions having a non-zero input value in at least one of the vectors in the set (step 801).

The NPU 106 will then fetch the relevant sets of weight values for the identified non-zero data positions from the memory 109 (step 802).

The relevant multiply accumulate operations using the fetched weight values and the non-zero input vector data positions will be performed (step 803), with the results of those operations being appropriately accumulated in a set of accumulators 804.

Once the input vectors have been processed in their entirety, then the accumulated results can be written back to the memory 109 for further processing and/or output (step 805).

In order to facilitate fetching only those weight values required for the non-zero data positions in the input vectors, the weight values are stored in memory as respective weight matrix columns, one after another, in order, such that an entire weight matrix column can be fetched from the memory (or skipped) in its entirety as a contiguous sequence (set) of memory addresses.

Figure 11:
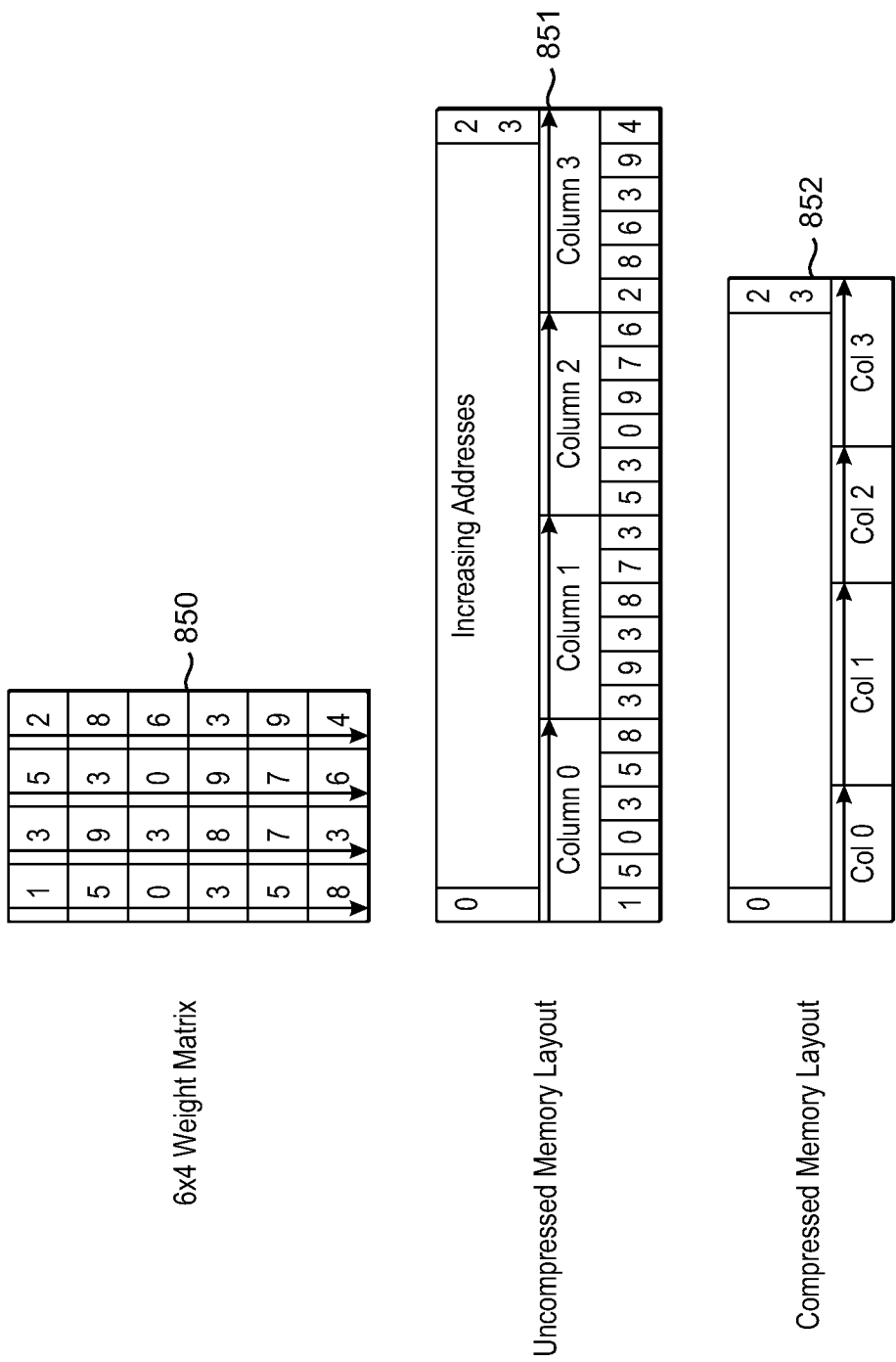
FIG. 11 shows schematically the storing of matrix values in memory in embodiments of the technology described herein.

FIG. 11 illustrates this, and shows that for an exemplary weight matrix 850 having four columns, the weight matrix values are stored in column order in memory. FIG. 11 shows this in the case where the weight matrix is stored in memory in an uncompressed form 851 (in which case each weight matrix column occupies the same space in memory), and in a (lossy) compressed form 852 in which each column can, as shown in FIG. 11, occupy a different amount of space in memory. In the latter case, appropriate metadata, such as pointers to the start of each column, and/or indicative of the respective weight matrix column sizes in the memory, can be provided, so as to facilitate fetching individual and particular weight matrix columns from the memory.

Other arrangements would, of course, be possible.

FIG. 9 shows exemplary operation of the embodiments of the technology described herein for input vectors having eight input vector data positions.

As will be appreciated by those skilled in the art, input vectors to be processed in a neural network, e.g. fully connected layer, may comprise many more than eight data positions. In that case, the operation of the technology described herein in an embodiment operates to scan successive "chunks" of the input vector data positions (with each such "chunk" comprising q, e.g. 8, data positions) to identify any data positions in the "chunk" having non-zero data values in at least one of the input vectors in the set, and then performs the matrix-vector multiply operation for those non-zero input vector data positions in the chunk accordingly, and then repeats the process for the next chunk of input vector data positions, and so on, whilst accumulating the results for each individual chunk of input data positions to thereby provide an overall output for the input vector as a whole.

Figure 12:
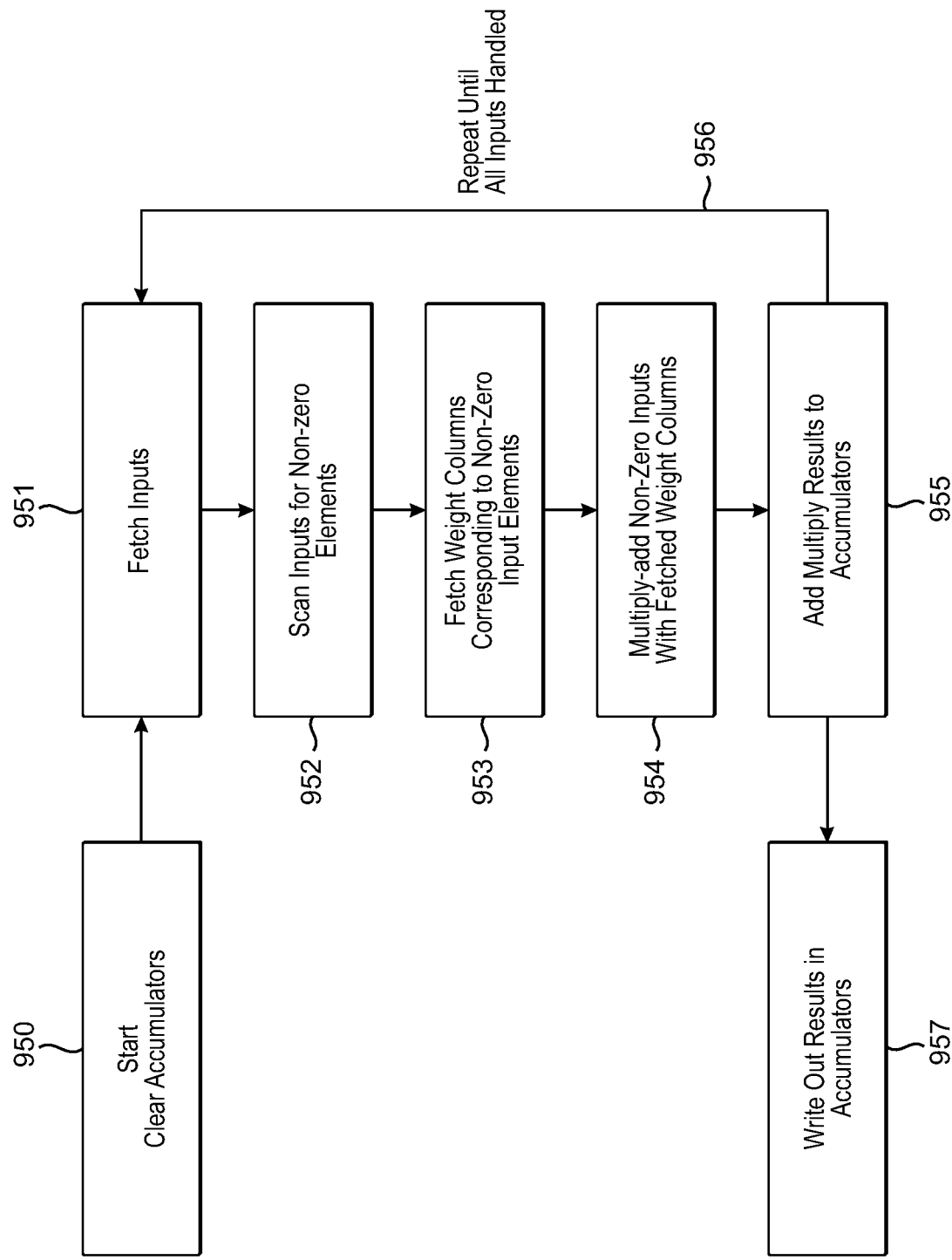
FIG. 12 shows schematically the operation of a neural network processor when performing a matrix-vector multiply operation in an embodiment of the technology described herein.

FIG. 12 illustrates this and shows in particular this operation where the results from successive chunks of input vector data positions are accumulated in a set of accumulators, one for each input vector in the set, with the final results from the accumulators then being written out as the final result for each input vector in its entirety.

Thus, as shown in FIG. 12, the process starts by clearing the accumulators for all the input vectors in the set (step 950).

The input values for a first chunk of input vector data positions are then fetched (step 951) and scanned to identify any input vector data positions in the chunk that have a non-zero value in at least one of the input vectors in the set of input vectors being considered (step 952).

The (weight) matrix values corresponding to the identified non-zero input vector data positions in the chunk are then fetched (step 953) and the appropriate matrix-vector multiply operations performed for the non-zero input vector data positions (step 954). The result of the matrix-vector multiply operations for the non-zero input vector data positions for the chunk are then added to a respective accumulator for each input vector in the set (step 955).

This process is then repeated for the next chunk of input vector data positions (step 956), i.e. such that that chunk of input data positions is scanned to identify any "non-zero" data positions, with the appropriate weight matrix values and matrix-vector multiply operations being performed for those non-zero input vector data positions, and the results for that chunk then being added to the respective accumulators for the different input vectors, and so on, until all the data positions in the input vectors have been considered.

The final accumulated results for each input vector can then be appropriately written out (step 957), for example for use as an input feature map for a next layer in the neural network.

Other arrangements would, of course, be possible.

It can be seen from the above that the technology described herein, in its embodiments at least, provides mechanisms for performing matrix-vector multiply operations when executing a neural network in a more efficient manner, and that, in particular, reduces the amount of memory traffic, bandwidth, etc., that may be required when performing such operations.

This is achieved, in the embodiments of the technology described herein at least, by identifying those input vector data positions that have non-zero values, and then fetching only the (weight) matrix values for those input vector data positions (and skipping fetching any (weight) matrix values for input vector positions that all have a value of zero), and performing the (weight) matrix-input vector multiply operations accordingly.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of performing a matrix-vector multiply operation when performing neural network processing in a data processing system, the data processing system comprising a processor operable to execute a neural network, and a memory for storing data relating to the neural network processing being performed by the processor; the method comprising:
when performing a matrix-vector multiply operation for neural network processing being performed by the processor:
for a set of plural input vectors to be multiplied by a matrix of data values, each input vector comprising n data positions, and the matrix of data values comprising n respective sets of data values, one set for each data position of the input vectors:
identifying plural sets of one or more of the n data positions of the input vectors for which the data value is non-zero in at least one of the plural input vectors, comprising for each of the plural sets of data positions identifying up to a maximum permitted number of data positions to be included in the set of data positions; and
for each of the plural identified sets of data positions of the input vectors for which the data value is non-zero in at least one of the input vectors in the set of plural input vectors:
for each of the data positions in the set of data positions identified as having a non-zero value in at least one of the input vectors in the set of plural input vectors:
fetching from memory the set of data values from the matrix of data values for that data position; and
for each input vector in the set of plural input vectors:
performing a matrix-vector multiply operation using the data values for the input vector for the data positions in the set of data positions identified as having a non-zero data value in at least one of the input vectors in the set of plural input vectors, and the fetched set(s) of data values from the matrix of data values for those data position(s).

2. The method of claim 1, wherein the matrix-vector multiply operation is for a fully connected layer of a neural network that the processor is executing or for a layer of a recurrent neural network that the processor is executing.

3. The method of claim 1, wherein the matrix-vector multiply operation comprises a matrix-vector multiply accumulate operation.

4. The method of claim 1, wherein:
the matrix of data values is stored in a compressed form in memory such that all of the matrix data values for an input vector data position are stored in a compressed form together in memory, such that the matrix of data values is stored in memory as respective complete compressed sets of respective input vector data position matrix data values.

5. The method of claim 1, further comprising:
for each input vector in the set of one or more input vectors, combining the results from processing each of the plural identified sets of data positions of the input vector(s) for which the data value is non-zero in at least one of the input vectors in the set of one or more input vectors, to provide an overall output result for the input vector in its entirety.

6. The method of claim 5, wherein:
combining the results from processing each of the plural identified sets of data positions of the input vector(s) for which the data value is non-zero in at least one of the input vectors in the set of one or more input vectors, to provide an overall output result for an input vector in its entirety comprises:
accumulating the results from processing each of the plural identified sets of data positions of the input vector(s) for which the data value is non-zero in at least one of the input vectors in the set of one or more input vectors for the input vector, to provide an overall output accumulated result for the input vector in its entirety.

7. The method of claim 1, comprising:
for any of the n data positions of the input vector(s) for which the data value is zero in all of the input vectors in the set of one or more input vectors:
not fetching from memory the set of data values from the matrix of data values for that data position; and
not performing a matrix-vector multiply operation for that data position.

8. A data processing system operable to perform neural network processing, the data processing system comprising:
a processor operable to execute a neural network; and
a memory for storing data relating to the neural network processing being performed by the processor;
the processor comprising:
a matrix-vector multiply circuit configured to perform matrix-vector multiply operations for neural network processing being performed by the processor;
an input vector scan circuit configured to, for a set of plural vectors to be multiplied by a matrix of data values, each input vector comprising n data positions, and the matrix of data values comprising n respective sets of data values, one set for each data position of the input vectors:
identify plural sets of one or more of the n data positions of the input vectors for which the data value is non-zero in at least one of the input vectors in the set of plural input vectors, comprising for each of the plural sets of data positions identifying up to a maximum permitted number of data positions to be included in the set of data positions;
and
a matrix data value fetching circuit configured to fetch from memory, for each of the plural identified sets of data positions of the input vectors for which the data value is non-zero in at least one of the input vectors in the set of plural input vectors, the set of data values from the matrix of data values for each of the data positions in the identified set of data positions;
wherein the matrix-vector multiply circuit is configured to perform, for each of the plural identified sets of data positions of the input vectors for which the data value is non-zero in at least one of the input vectors in the set of one or more input vectors, for each input vector in the set of plural input vectors:
a matrix-vector multiply operation using the data values for the input vector for the identified set of data positions having a non-zero data value in at least one of the input vectors in the set of plural input vectors, and the fetched set(s) of data values from the matrix of data values for those data position(s).

9. The system of claim 8, wherein the matrix-vector multiply operation is for a fully connected layer of a neural network that the processor is executing or for a layer of a recurrent neural network that the processor is executing.

10. The system of claim 8, wherein the matrix-vector multiply operation comprises a matrix-vector multiply accumulate operation.

11. The system of claim 8, wherein:
the matrix of data values is stored in memory in a compressed form such that all of the matrix data values for an input vector data position are stored in a compressed form together in memory, such that the matrix of data values is stored in memory as respective complete compressed sets of respective input vector data position matrix data values.

12. The system of claim 8, wherein:
the matrix vector multiply circuit is configured to:
for each input vector in the set of one or more input vectors, combine the results from processing each of the plural identified sets of data positions of the input vector(s) for which the data value is non-zero in at least one of the input vectors in the set of one or more input vectors, to provide an overall output result for the input vector in its entirety.

13. The system of claim 12, wherein:
the matrix vector multiply circuit is configured to combine the results from processing each of the plural identified sets of data positions of the input vector(s) for which the data value is non-zero in at least one of the input vectors in the set of one or more input vectors for an input vector, to provide an overall output result for the input vector in its entirety by:
accumulating the results from processing each of the plural identified sets of data positions of the input vector(s) for which the data value is non-zero in at least one of the input vectors in the set of one or more input vectors for the input vector, to provide an overall output accumulated result for the input vector in its entirety.

14. The system of claim 8, wherein:
the matrix data value fetching circuit is configured to skip fetching from memory the set of data values from the matrix of data values for any data position of the n data positions of the input vector(s) for which the data value is zero in all of the input vectors in the set of one or more input vectors.

15. A non-transitory computer readable storage medium storing computer software code which when executing on a processor performs a method of performing a matrix-vector multiply operation when performing neural network processing in a data processing system, the data processing system comprising a processor operable to execute a neural network, and a memory for storing data relating to the neural network processing being performed by the processor; the method comprising:
when performing a matrix-vector multiply operation for neural network processing being performed by the processor:
for a set of plural input vectors to be multiplied by a matrix of data values, each input vector comprising n data positions, and the matrix of data values comprising n respective sets of data values, one set for each data position of the input vectors:
identifying plural sets of one or more of the n data positions of the input vector(s) for which the data value is non-zero in at least one of the plural input vectors, comprising for each of the plural sets of data positions identifying up to a maximum permitted number of data positions to be included in the set of data positions; and
for each of the plural identified sets of data positions of the input vectors for which the data value is non-zero in at least one of the input vectors in the set of plural input vectors:
for each of the data positions in the set of data positions identified as having a non-zero value in at least one of the input vectors in the set of plural input vectors:
fetching from memory the set of data values from the matrix of data values for that data position; and
for each input vector in the set of plural input vectors:
performing a matrix-vector multiply operation using the data values for the input vector for the data positions in the set of data positions identified as having a non-zero data value in at least one of the input vectors in the set of plural input vectors, and the fetched set(s) of data values from the matrix of data values for those data position(s).

* * * * *